(12) United States Patent
Linzer

(10) Patent No.: US 12,327,176 B1
(45) Date of Patent: Jun. 10, 2025

(54) CONVOLUTIONAL NEURAL NETWORK WITH MULTIPLE OUTPUT FRAMES

(71) Applicant: Ambarella International LP, Santa Clara, CA (US)

(72) Inventor: Elliot N. Linzer, Bergenfield, NY (US)

(73) Assignee: Ambarella International LP, Santa Clara, CA (US)

( * ) Notice: Subject to any disclaimer, the term of this patent is extended or adjusted under 35 U.S.C. 154(b) by 1060 days.

(21) Appl. No.: 17/123,528

(22) Filed: Dec. 16, 2020

(51) Int. Cl.
*G06N 3/06* (2006.01)
*G06N 3/04* (2023.01)
*G06N 3/063* (2023.01)
*G06T 5/50* (2006.01)
*G06T 7/246* (2017.01)

(52) U.S. Cl.
CPC ............... *G06N 3/063* (2013.01); *G06N 3/04* (2013.01); *G06T 5/50* (2013.01); *G06T 7/248* (2017.01); *G06T 2207/10024* (2013.01); *G06T 2207/20084* (2013.01)

(58) Field of Classification Search
CPC . G06N 3/063; G06N 3/04; G06T 5/50; G06T 7/248; G06T 2207/10024; G06T 2207/20084
See application file for complete search history.

(56) References Cited

U.S. PATENT DOCUMENTS

| | | | | |
|---|---|---|---|---|
| 10,089,743 B1 * | 10/2018 | Kim et al. | ............ | G06K 9/6267 |
| 10,805,634 B2 * | 10/2020 | Kapoor et al. | ........ | H04N 5/3575 |
| 11,354,541 B2 * | 6/2022 | Wang et al. | ......... | G06K 9/6257 |
| 2014/0337262 A1 * | 11/2014 | Kato et al. | ............... | G06N 3/06 |
| 2020/0137380 A1 * | 4/2020 | Supikov et al. | ..... | H04N 13/395 |

OTHER PUBLICATIONS

T. Wang et al., MSU-Net: Multiscale Statistical U-Net for Real-time 3D Cardiac MRI Video Segmentation, Sep. 2019, Medical Image Computing and Computer Assisted Intervention—MICCAI 2019 (Year: 2019).*

* cited by examiner

*Primary Examiner* — Van C Mang
(74) *Attorney, Agent, or Firm* — Ambarella International LP

(57) ABSTRACT

An apparatus includes a convolutional neural network comprising (i) a first convolution having a plurality of input frames and (ii) a last convolution having a plurality of output frames. Each output frame generally represents a different instance in time.

20 Claims, 7 Drawing Sheets

CONVOLUTIONAL NEURAL NETWORK WITH MULTIPLE OUTPUT FRAMES

FIELD OF THE INVENTION

The invention relates to artificial neural networks generally and, more particularly, to a method and/or apparatus for implementing a convolutional neural network with multiple output frames.

BACKGROUND

For video, some convolutional neural networks (CNNs) use multiple frames as input to get a higher quality result. For example, frames N, N−1 and N+1 may all be used to detect objects in frame N. Higher quality in this context means that the number of false positives and/or false negatives is reduced by using temporal information. A conventional CNN needs to be run for each frame N.

It would be desirable to implement a convolutional neural network with multiple output frames.

SUMMARY

The invention encompasses an aspect concerning an apparatus comprising a convolutional neural network comprising (i) a first convolution having a plurality of input frames and (ii) a last convolution having a plurality of output frames. Each output frame generally represents a different instance in time.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
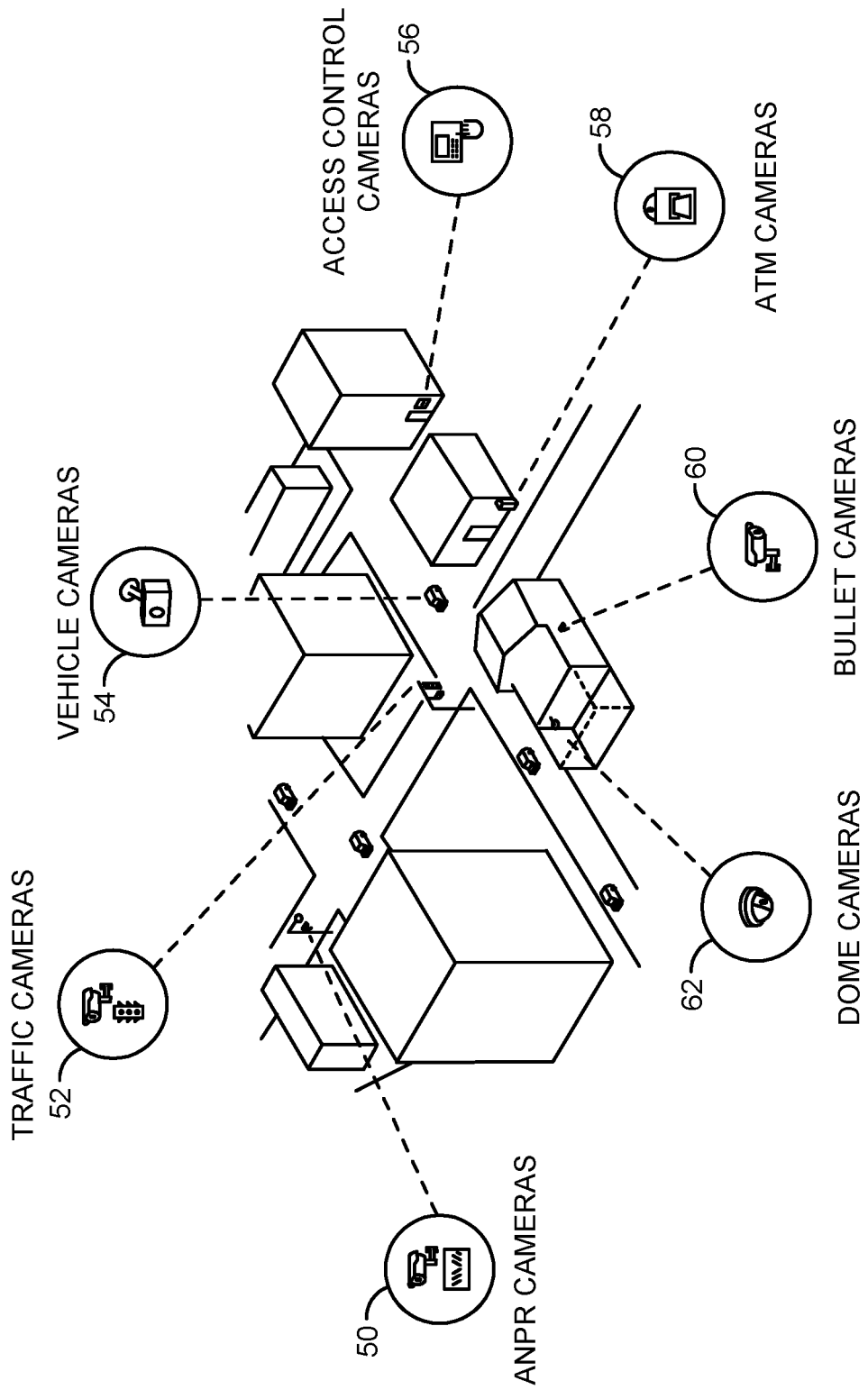
FIG. 1 is a diagram illustrating examples of edge devices that may utilize a convolutional neural network with multiple output frames in accordance with example embodiments of the invention.

Embodiments of the present invention include providing a convolutional neural network with multiple output frames that may (i) provide two or more output frames with each run, (ii) reduce an amount of computation per frame, (iii) increase a number of frames per second a particular amount of processing can accomplish, (iv) increase a number of inputs to a first convolution and a number of outputs of a last convolution, (v) reduce the number of times a network needs to be run for a given number of frames per second, (vi) utilize a UNet neural network architecture with a novel output convolution layer, (vii) provide a plurality of time instances per network execution, (viii) be applied in image processing, (ix) be applied in image recognition, (x) be applied in image segmentation, and/or (xi) be implemented as one or more integrated circuits.

In various embodiments, a convolutional neural network (CNN) with multiple output frames may be implemented to improve the speed of the network. In this context the frames are for different time instances. In an example embodiment, each frame comprises pixel data for a single instance in time. In an example, each frame may comprise a number of planes. In various embodiments, a convolutional neural network (CNN) with multiple output frames may be utilized in a variety of applications. In an image processing application, the input frames may be noisy Bayer frames and the output may be clean RGB frames. When applied to video, the input may be a time series of noisy Bayer frames and the output may be time series of clean RGB frames. In some applications, the output may be YUV frames. In an example, a color image frame may comprise three planes corresponding to the dimensions of a particular color space (e.g., R, G, and B, or Y, U, and V). In an image recognition application for video, the input may comprise a time series of images and the output may comprise a time series of detections (e.g., objects detected with locations). In an example, a detection frame may comprise a number of planes corresponding to different types of objects detected (e.g., a plane of car detections, a plane of pedestrian detections, etc.). In an example, the output frames may comprise a separate plane for each object type. In an image segmentation application for video, the input may comprise a time series of images and the output may comprise a time series of segmentation maps (e.g., dividing a scene into street, sidewalk, sky, etc.). In an example, a segmentation frame may comprise a number of planes corresponding to each segmentation map.

In various embodiments, the processing of a neural network in accordance with an embodiment of the invention may be generalized to use N input frames and M output frames. In one example, the neural network may be implemented having N=2 input frames and M=2 output frames, with the input and output frames corresponding to the same instances in time. In a second example, the neural network may be implemented having N=4 input frames and M=2 output frames. An advantage of using multiple output frames is that the amount of computation per frame is reduced, or, equivalently, that the number of frames per second that a given amount of processing can accomplish is increased. In general, the total processing load for the neural network is higher when input or output frames are added; the first convolution has more inputs and the last convolution has more outputs, increasing the computations for those convolutions. However, for a neural network in accordance with an embodiment of the invention, the processing may be done M times less frequently. For example, in a neural network embodiment with M=3, the neural network would be run once to produce output frames 1, 2, and 3, then run again to produce output frames 4, 5, and 6, etc. So long as the computations per network instance are not increased by M times or more, the total amount of computation per frame is reduced.

In an example, a conventional image-processing network may be implemented with 4 input planes and 12 output planes, all for a single instance of time. In contrast, an image-processing network in accordance with embodiments of the invention may have 4*N input planes and 12*M output planes, where each of the N groups of 4 input planes and each of the M groups of 12 output planes are for a different instance of time. In general, an image-processing network in accordance with embodiments of the invention may have N input frames, where N is greater than or equal to 2, and M output frames with $P_o$ planes per frame, where M is greater than or equal to 2 and $P_o$ is greater than or equal to 1.

Referring to FIG. 1, a diagram is shown illustrating examples of edge devices that may utilize a convolutional neural network in accordance with example embodiments of the invention. In an example, edge devices incorporating smart IP cameras may include low power technology designed to be deployed in embedded platforms at the edge of a network (e.g., microprocessors running on sensors, cameras, or other battery-powered devices), where power consumption is a critical concern. In an example, edge devices incorporating smart IP cameras may comprise traffic cameras and intelligent transportation systems (ITS) solutions including automated number plate recognition (ANPR) cameras 50, traffic cameras 52, vehicle cameras 54, access control cameras 56, automatic teller machine (ATM) cameras 58, bullet cameras 60, and dome cameras 62. In an example, the traffic cameras and intelligent transportation systems (ITS) solutions may be designed to enhance roadway security with a combination of person and vehicle detection, vehicle make/model recognition, and automatic number plate recognition (ANPR) capabilities.

Figure 2:
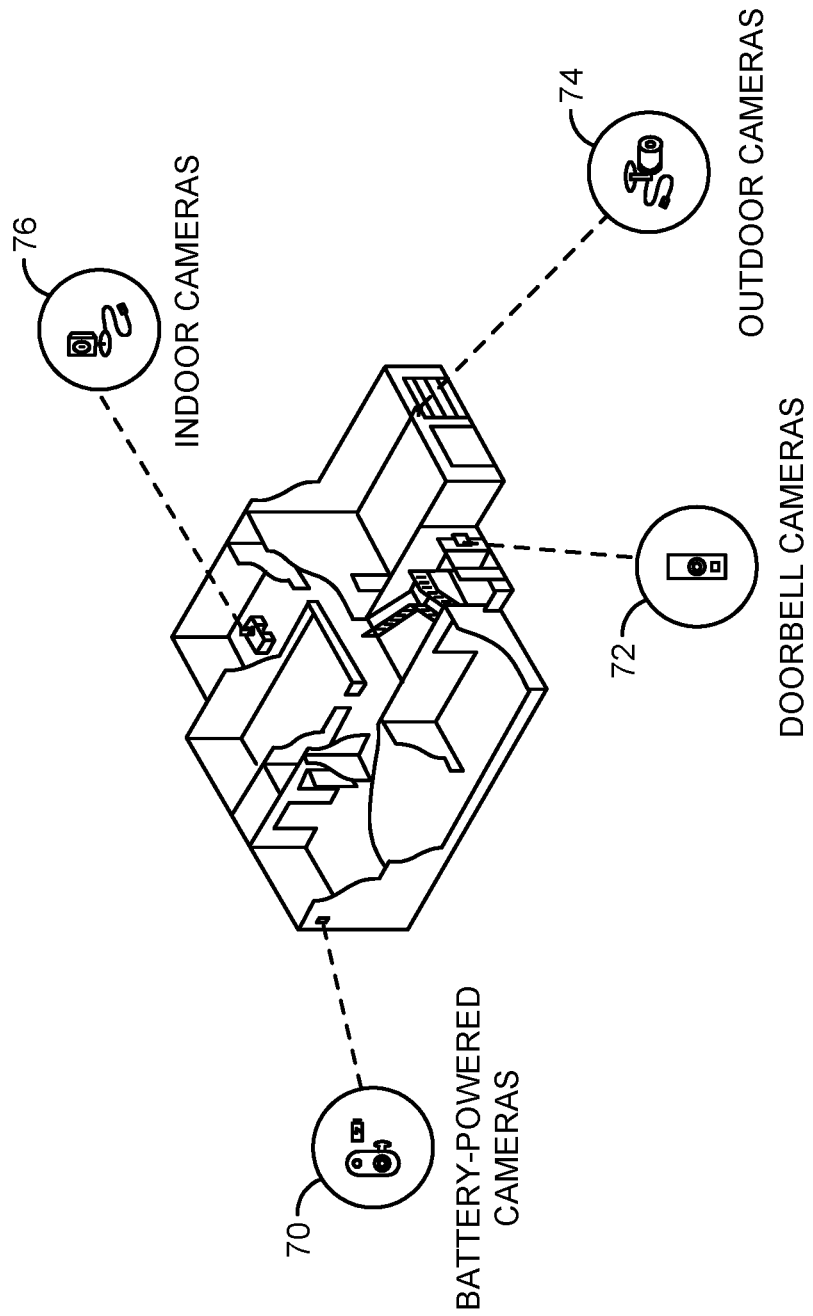
FIG. 2 is a diagram illustrating additional examples of edge devices that may utilize a convolutional neural network with multiple output frames in accordance with example embodiments of the invention.

Referring to FIG. 2, a diagram is shown illustrating additional examples of edge devices that may utilize a convolutional neural network in accordance with example embodiments of the invention. In an example, edge devices incorporating a convolutional neural network in accordance with embodiments of the invention may be utilized in security (surveillance) camera and/or access control applications. In an example, the security camera and access control applications may include battery-powered cameras 70, doorbell cameras 72, outdoor cameras 74, and indoor cameras 76. In an example, the security camera and access control application edge devices may include low power technology designed to be deployed in embedded platforms at the edge (e.g., microprocessors/controllers running on battery-powered devices), where power consumption is a critical concern. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption.

Figure 3:
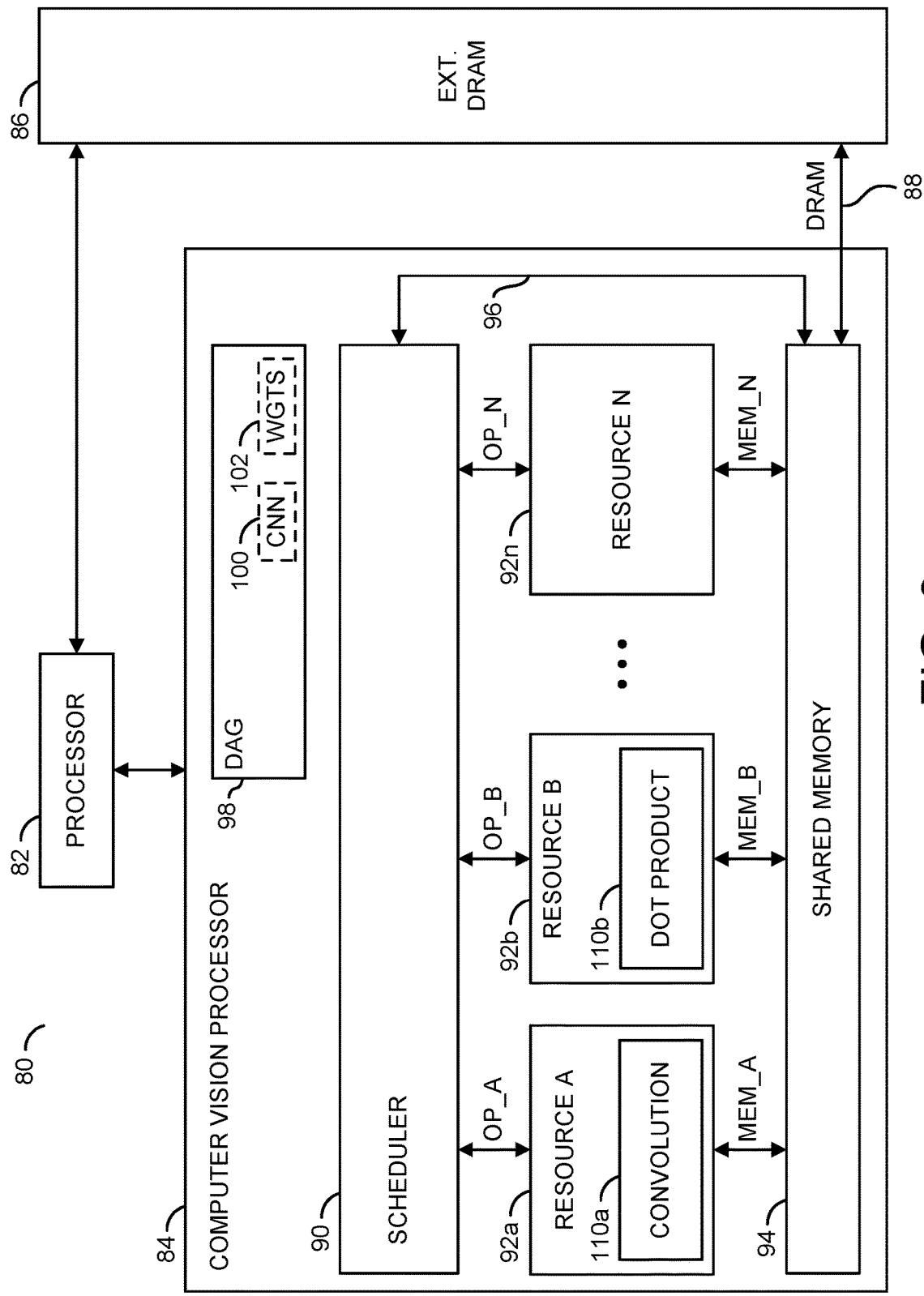
FIG. 3 is a diagram illustrating a processing circuit in which a convolutional neural network with multiple output frames in accordance with example embodiments of the invention may be implemented.

Referring to FIG. 3, a diagram is shown illustrating a processing circuit 80 in which a convolutional neural network in accordance with example embodiments of the invention may be implemented. In an example, the processing circuit 80 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuit 80 generally comprises hardware circuitry that is optimized to provide a high performance image processing and computer vision pipeline in minimal area and with minimal power consumption. In an example, various operations used to perform image processing, feature detection/extraction, and/or object detection/classification for computer (or machine) vision may be implemented using hardware modules designed to reduce computational complexity and use resources efficiently.

In an example embodiment, the processing circuit 80 may comprise a block (or circuit) 82, a block (or circuit) 84, a block (or circuit) 86, and/or a memory bus 88. The circuit 82 may implement a first processor. The circuit 84 may implement a second processor. In an example, the circuit 84 may implement a computer vision processor. In an example, the processor 84 may be an intelligent vision processor. The circuit 86 may implement an external memory (e.g., a memory external to the circuits 82 and 84). In an example, the circuit 86 may be implemented as a dynamic random access memory (DRAM) circuit. The processing circuit 80 may comprise other components (not shown). The number, type and/or arrangement of the components of the processing circuit 80 may be varied according to the design criteria of a particular implementation.

The circuit 82 may implement a processor circuit. In some embodiments, the processor circuit 82 may be implemented using a general purpose processor circuit. The processor 82 may be operational to interact with the circuit 84 and the circuit 86 to perform various processing tasks. In an example, the processor 82 may be configured as a controller for the circuit 84. The processor 82 may be configured to execute computer readable instructions. In one example, the computer readable instructions may be stored by the circuit 86. In some embodiments, the computer readable instructions may comprise controller operations. The processor 82 may be configured to communicate with the circuit 84 and/or access results generated by components of the circuit 84. In an example, the processor 82 may be configured to utilize the circuit 84 to perform operations associated with one or more neural network models.

In an example, the processor 82 may be configured to program the circuit 84 with one or more pre-trained artificial neural network models (ANNs) including a convolutional neural network (CNN) 100 having multiple output frames in accordance with embodiments of the invention and weights/kernels (WGTS) 102 utilized by the CNN 100. In various embodiments, the CNN 100 may be configured (trained) for operation in an edge device. In an example, the processing circuit 80 may be coupled to a sensor (e.g., video camera, etc.) configured to generate a data input. The processing circuit 80 may be configured to generate one or more outputs in response to the data input from the sensor based on one or more inferences made by executing the pre-trained CNN 100 with the weights/kernels (WGTS) 102. The operations performed by the processor 82 may be varied according to the design criteria of a particular implementation.

In various embodiments, the circuit 86 may implement a dynamic random access memory (DRAM) circuit. The circuit 86 is generally operational to store multidimensional arrays of input data elements and various forms of output data elements. The circuit 86 may exchange the input data elements and the output data elements with the processor 82 and the processor 84.

The processor 84 may implement a computer vision processor circuit. In an example, the processor 84 may be configured to implement various functionality used for computer vision. The processor 84 is generally operational to perform specific processing tasks as arranged by the processor 82. In various embodiments, all or portions of the processor 84 may be implemented solely in hardware. The processor 84 may directly execute a data flow directed to execution of the CNN 100, and generated by software (e.g., a directed acyclic graph, etc.) that specifies processing (e.g., computer vision) tasks. In some embodiments, the processor 84 may be a representative example of numerous computer vision processors implemented by the processing circuit 80 and configured to operate together.

In an example, the processor 84 generally comprises a block (or circuit) 90, one or more blocks (or circuits) 92a-92n, a block (or circuit) 94, a path 96, and a block (or circuit) 98. The block 90 may implement a scheduler circuit. The blocks 92a-92n may implement hardware resources (or engines). The block may implement a shared memory circuit. The block 98 may implement a directed acyclic graph (DAG) memory. In an example embodiment, one or more of the circuits 92a-92n may comprise blocks (or circuits) 110a-110n. In the example shown, circuits 110a and 110b are implemented.

In an example, the circuit 110a may implement convolution operations. In another example, the circuit 110b may be configured to provide dot product operations. The convolution and dot product operations may be used to perform computer (or machine) vision tasks (e.g., as part of an object detection process, etc.). In yet another example, one or more of the circuits 92c-92n may comprise blocks (or circuits) 110c-110n (not shown) to provide convolution calculations in multiple dimensions.

In an example, the circuit 84 may be configured to receive directed acyclic graphs (DAGs) from the processor 82. The DAGs received from the processor 82 may be stored in the DAG memory 98. The circuit 84 may be configured to execute a DAG for the CNN 100 using the circuits 90, 92a-92n, and 94.

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM_A to MEM_N) may be exchanged between the respective circuits 92a-92n and the circuit 94. The signals MEM_A to MEM_N may carry data. A signal (e.g., DRAM) may be exchanged between the circuit 86 and the circuit 94. The signal DRAM may transfer data between the circuits 86 and 90 (e.g., on the memory bus 96).

The circuit 90 may implement a scheduler circuit. The scheduler circuit 90 is generally operational to schedule tasks among the circuits 92a-92n to perform a variety of computer vision related tasks as defined by the processor 82. Individual tasks may be allocated by the scheduler circuit 90 to the circuits 92a-92n. The scheduler circuit 90 may allocate the individual tasks in response to parsing the directed acyclic graphs (DAGs) provided by the processor 82. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. The hardware engines 92a-92n may be implemented to include dedicated hardware circuits that are optimized for high-performance and low power consumption while performing the specific processing tasks. In some configurations, the hardware engines 92a-92n may operate in parallel and independent of each other. In other configurations, the hardware engines 92a-92n may operate collectively among each other to perform allocated tasks.

The hardware engines 92a-92n may be homogenous processing resources (e.g., all circuits 92a-92n may have the same capabilities) or heterogeneous processing resources (e.g., two or more circuits 92a-92n may have different capabilities). The hardware engines 92a-92n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 92a-92n may be implemented solely as hardware circuits. In some embodiments, the hardware engines 92a-92n may be implemented as generic engines that may be configured through circuit customization and/or software/firmware to operate as special purpose machines (or engines). In some embodiments, the hardware engines 92a-92n may instead be implemented as one or more instances or threads of program code executed on the processor 82 and/or one or more processors 84, including, but not limited to, a vector processor, a central processing unit (CPU), a digital signal processor (DSP), or a graphics processing unit (GPU). In some embodiments, one or more of the hardware engines 92a-92n may be selected for a particular process and/or thread by the scheduler 90. The scheduler 90 may be configured to assign the hardware engines 92a-92n to particular tasks in response to parsing the directed acyclic graphs stored in the DAG memory 98.

The circuit 94 may implement a shared memory circuit. The shared memory 94 may be configured to store data in response to input requests and/or present data in response to output requests (e.g., requests from the processor 82, the DRAM 86, the scheduler circuit 90 and/or the hardware engines 92a-92n). In an example, the shared memory circuit 94 may implement an on-chip memory for the computer vision processor 84. The shared memory 94 is generally operational to store all of or portions of the multidimensional arrays (or vectors) of input data elements and output data elements generated and/or utilized by the hardware engines 92a-92n. The input data elements may be transferred to the shared memory 94 from the DRAM circuit 86 via the memory bus 88. The output data elements may be sent from the shared memory 94 to the DRAM circuit 86 via the memory bus 88.

The path 96 may implement a transfer path internal to the processor 84. The transfer path 96 is generally operational to move data from the scheduler circuit 90 to the shared memory 94. The transfer path 96 may also be operational to move data from the shared memory 94 to the scheduler circuit 90.

The processor 82 is shown communicating with the computer vision processor 84. The processor 82 may be configured as a controller for the computer vision processor 84. In some embodiments, the processor 82 may be configured to transfer instructions to the scheduler 90. For example, the processor 82 may provide one or more directed acyclic graphs to the scheduler 90 via the DAG memory 98. The scheduler 90 may initialize and/or configure the hardware engines 92a-92n in response to parsing the directed acyclic graphs. In some embodiments, the processor 82 may receive status information from the scheduler 90. For example, the scheduler 90 may provide a status information and/or readiness of outputs from the hardware engines 92a-92n to the processor 82 to enable the processor 82 to determine one or more next instructions to execute and/or decisions to make. In some embodiments, the processor 82 may be configured to communicate with the shared memory 94 (e.g., directly or through the scheduler 90, which receives data from the shared memory 94 via the path 96). The processor 82 may be configured to retrieve information from the shared memory 94 to make decisions. The instructions performed by the processor 82 in response to information from the computer vision processor 84 may be varied according to the design criteria of a particular implementation.

Figure 4:
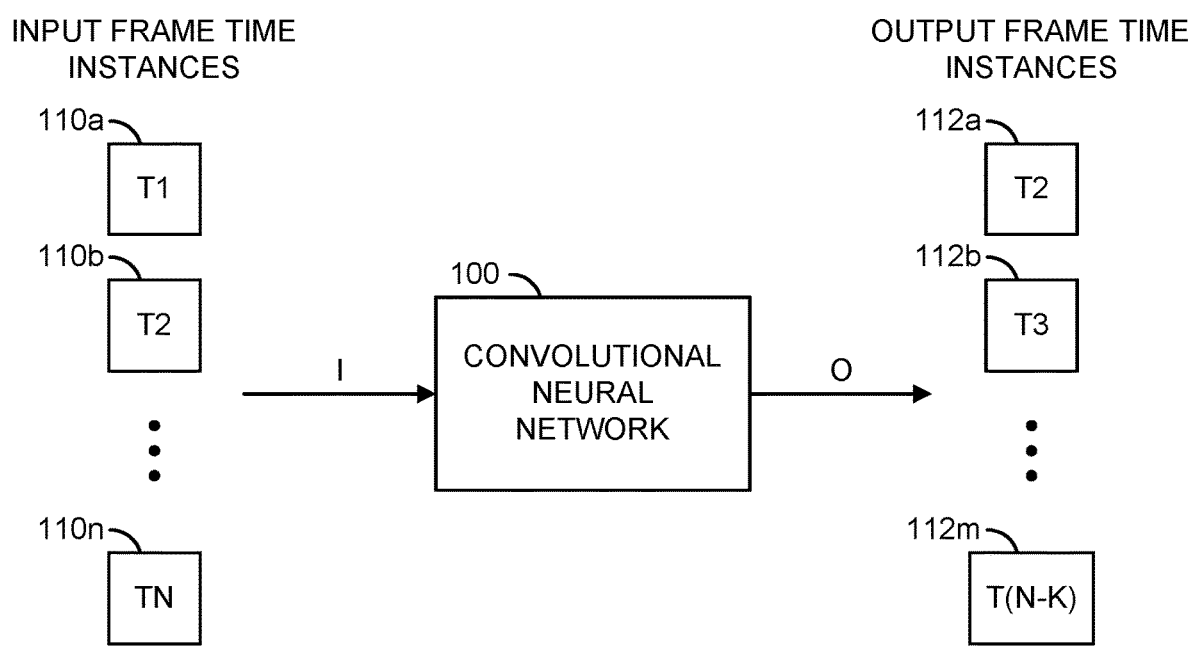
FIG. 4 is a diagram illustrating input and output frames of a convolutional neural network in accordance with example embodiments of the invention.

Referring to FIG. 4, a diagram is shown illustrating a convolutional neural network in accordance with an example embodiment of the invention. In various embodiments, the convolutional neural network (CNN) 100 may be implemented with multiple output frames. The multiple output frames generally improve the effective processing speed of the convolutional neural network (CNN) 100. In an example, each of the multiple output frames may be for different time instances. In various embodiments, the processing of the convolutional neural network (CNN) 100 may be generalized to use a first number (e.g., N) of input frames 110a-110n and a second number (e.g., M) of output frames 112a-112m. In various embodiments, each of the M output frames may comprise a third number (e.g., Po) of output planes. In general, each output frame may comprise one or more (e.g., Po≥1) output planes (e.g., object, object/not object, object_1/object 2, object_1/object 2/object_3, monochrome image, RGB/YUV color image planes, disparity map, etc.) may be implemented. Thus, for a network providing M output frames there are generally Po*M output planes.

In one example, two input frames and two output frames (e.g., N=2 and M=2) may be implemented, with the input and output frames corresponding to the same instances in time. In a second example, four input frames and two output frames (e.g., N=4 and M=2) may be implemented. In general, the number of output frames may be less than (e.g., M=N−K) or equal to (e.g., M=N) the number of input frames. An advantage of using the multiple output frames 112a-112m is that the amount of computation per frame may be reduced, or, equivalently, that the number of frames per second that a given amount of processing can accomplish may be increased. The total processing for the convolutional neural network 100 is higher when input or output frames are added; the first convolution has more inputs and the last convolution has more outputs, increasing the computations for those convolutions. However, the neural network processing needs to be done M times less frequently. For example, when M=3 the CNN 100 may be run to produce outputs for time instances 1, 2, and 3, then run again to produce outputs for time instances 4, 5, and 6, etc. So long as the computations per network instance are not increased by M times or more, the total amount of computation per frame is reduced.

In an example, the convolutional neural network 100 may be implemented with a first number (e.g., Pi=4) of input planes per frame and a second number (e.g., Po=12) of output planes per frame. In the example with 4 input planes and 12 output planes per frame, the CNN 100 would have 4*N input planes and 12*M output planes, where each of the N groups of 4 input planes and each of the M groups of 12 output planes are for a different instance of time.

Figure 5:
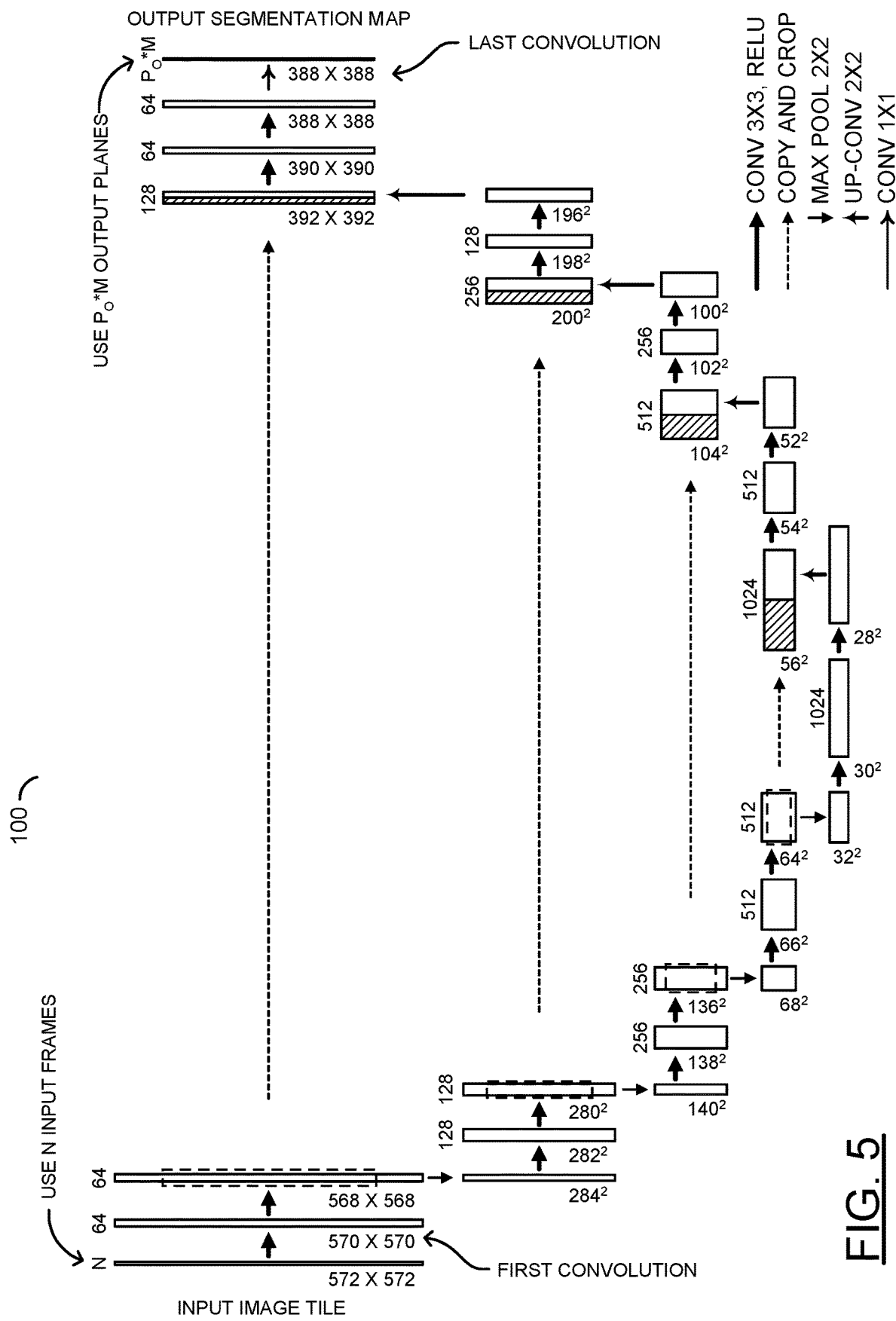
FIG. 5 is a diagram illustrating an example implementation of a convolutional neural network with multiple output frames in accordance with example embodiments of the invention.

Referring to FIG. 5, a diagram is shown illustrating an example implementation of a convolutional neural network with multiple output frames in accordance with example embodiments of the invention. In an example embodiment, the CNN 100 may be implemented with a UNet architecture. The architecture looks like a "U", hence the name UNet. The architecture generally comprises three sections: a contraction section, a bottleneck section, and an expansion section. The contraction section is made of many contraction blocks. Each contraction block takes an input, applies two 3×3 convolution layers, followed by a 2×2 pooling (e.g., max pooling or average pooling). The number of kernels or feature maps after each contraction block doubles so that the architecture can learn the complex structures effectively. The bottommost layer mediates between the contraction layer and the expansion layer. In an example, the bottommost layer may use two 3×3 CNN layers followed by a 2×2 up convolution layer.

The heart of the UNet architecture is in the expansion section. Similar to the contraction section, the expansion section also comprises several expansion blocks. Each expansion block passes the input to two 3×3 CNN layers followed by a 2×2 upsampling layer. Also after each expansion block, the number of feature maps used by the convolutional layer get halved to maintain symmetry. However, every time the input is also appended by feature maps of the corresponding contraction layer. This action ensures that the features that are learned while contracting the image will be used to reconstruct the image. The number of expansion blocks is generally the same as the number of contraction blocks. After that, the resultant mapping passes through another 3×3 CNN layer with the number of feature maps per frame equal to the number of segments desired. A final 1×1 convolution layer is used to produce $P_o$*M output planes, where M is greater than or equal to 2 and $P_o$ is greater than or equal to 1.

Figure 6:
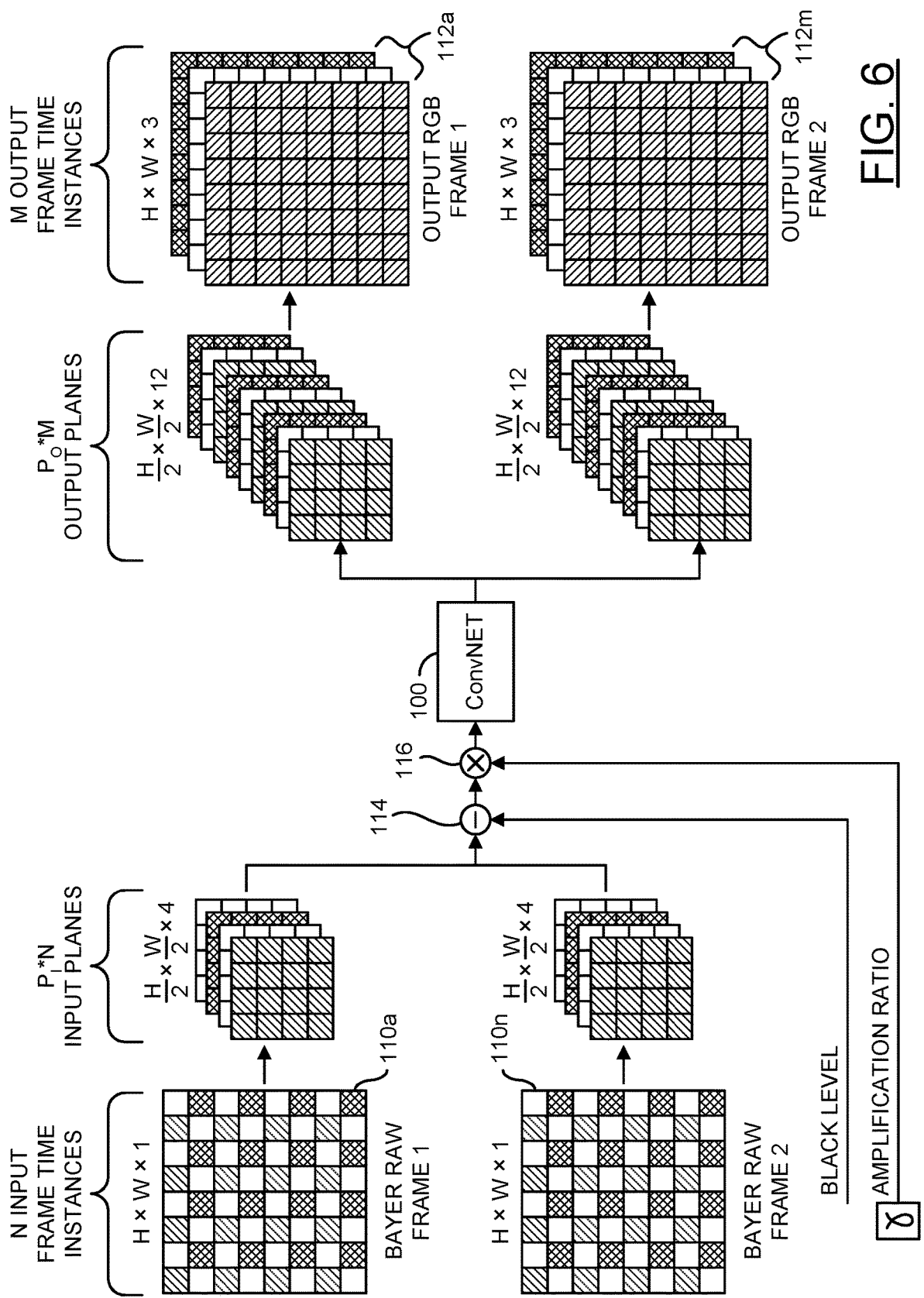
FIG. 6 is a diagram illustrating an example application of a convolutional neural network with multiple output frames in accordance with example embodiments of the invention.

Referring to FIG. 6, a diagram is shown illustrating an example application of a convolutional neural network (or ConvNet) with multiple output frames in accordance with example embodiments of the invention. In various embodiments, the processing of a neural network in accordance with an embodiment of the invention may be generalized to use N input frames and M output frames. In various embodiments, the processing of a neural network in accordance with an embodiment of the invention may be further generalized to use $P_i$ input planes per input frame and $P_o$ output planes per output frame. In an example, the convolutional neural network (CNN) 100 may be implemented as part of an image processing pipeline. In an image processing pipeline example, the convolutional neural network (CNN) 100 may be implemented having N=2 input frames 110a-110n and M=2 output frames 112a-112m, with the input and output frames corresponding to the same instances in time. In an example, the CNN 100 may be further implemented having four input planes (e.g., $P_i$=4) and twelve output planes (e.g., $P_o$=12) for each frame (or instance of time). For an image-processing network in accordance with embodiments of the invention having 4*N input planes and 12*M output planes, each of the N groups of 4 input planes and each of the M groups of 12 output planes may be for a different instance of time.

In an example, the CNN 100 may be configured (and trained) to receive raw Bayer pattern frames as the N=2 input frames 110a-110n and generate RGB frames as the M=2 output frames 112a-112m. The raw Bayer pattern input frames 110a-110n generally comprise one plane of pixels, each of which is red (R), green (G), or blue (B). The Bayer pattern may comprise a repeating pattern of the red, green, and blue pixels. For example, the following 4×4 pattern is generally repeated across the sensor:

| R | G |
|---|---|
| G | B |

The RGB output frames 112a-112m generally comprise three planes, one each of R, G, and B. The Bayer input frames and RGB output frames generally have a height H and a width W.

Because a neural network does not work well on a Bayer pattern frame, each of the H×W Bayer input frames 110a-110n may be converted to four planes (or channels) with the spatial resolution correspondingly reduced by a factor of two in each dimension (e.g., ½*H×½*W sized planes that constitute one Bayer pattern frame). In an example, a black level for the frames may be subtracted using a subtraction operation 114 and the data may be scaled by a predetermined amplification ratio (e.g., y) using a multiplication operation 116. In an example, the amplification ratio may be provided as an external input similar to an ISO setting on a camera. The amplification ratio generally determines a brightness level of the output. The converted and scaled data may be fed into the CNN 100.

In an example, the CNN 100 may be implemented as a fully-convolutional network (FCN). In an example, the CNN 100 may be implemented using a U-net. In another example, the CNN 100 may be implemented using a multi-scale context aggregation network (CAN). However, other network architectures may be implemented accordingly to meet design criteria of a particular implementation. In an example, the CNN 100 may be configured to provide noise reduction and color transformation. The output of the CNN 100 generally has the same reduced spatial resolution (e.g., ½*H×½*W size planes), but instead of four planes (or channels), the output may have twelve planes (or channels) to represent each whole output frame. The twelve half-sized output planes per frame may be shuffled into three full-sized RGB planes of each output frame 112a-112m. In an example, the $P_o$*M output planes may be processed by a sub-pixel layer to recover the M frames with the original resolution.

Figure 7:
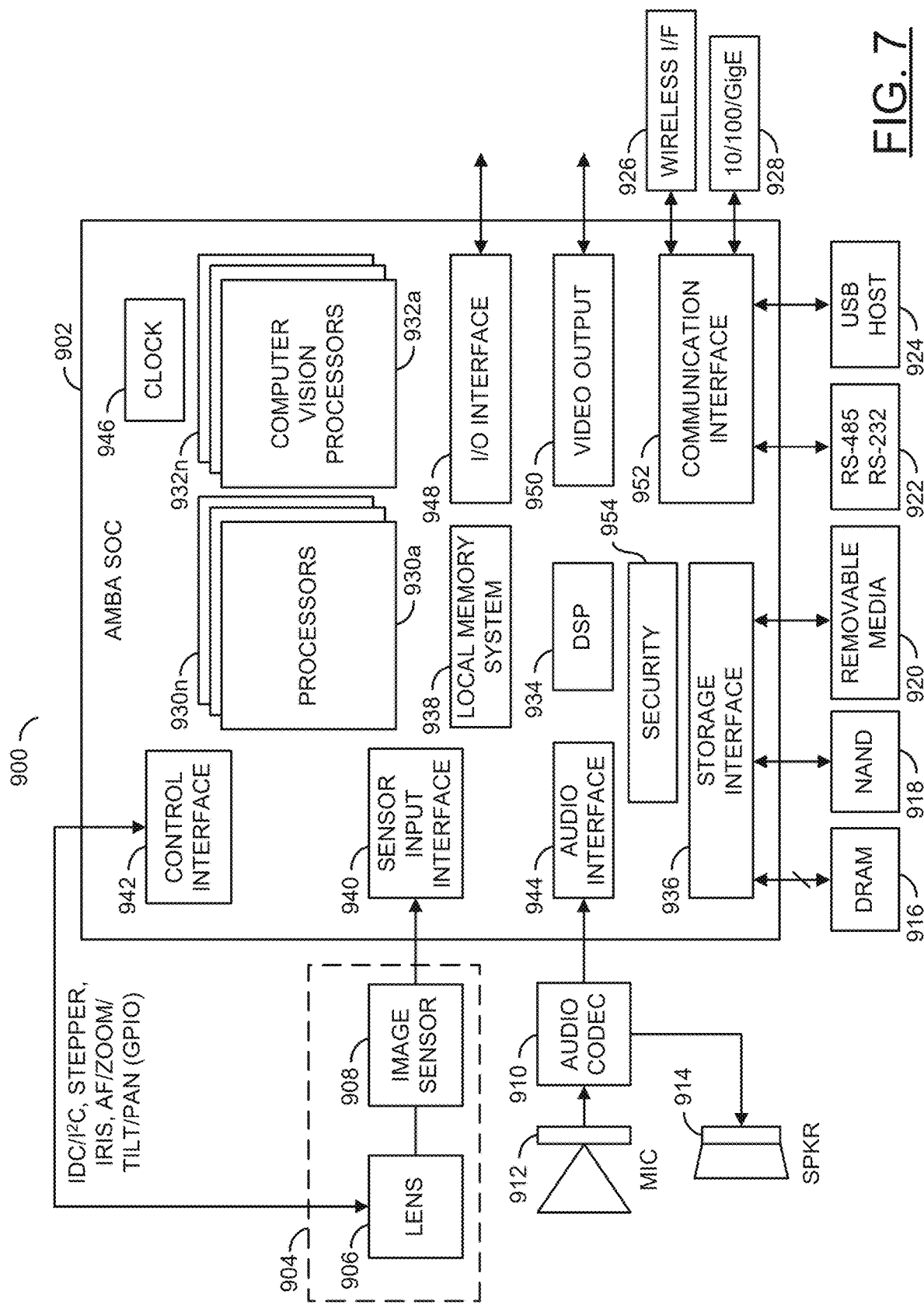
FIG. 7 is a diagram of a camera system 900 illustrating an example implementation of a computer vision system in which a convolutional neural network with multiple output frames in accordance with example embodiments of the invention may be utilized.

Referring to FIG. 7, a diagram of a camera system 900 is shown illustrating an example implementation of a computer vision system in which a convolutional neural network with multiple output frames in accordance with example embodiments of the invention may be implemented. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the circuits and processes described above in connection with FIG. 1 through FIG. 5.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be implemented as one or more image sensors. In one example, the circuit 908 may be implemented as an RGB sensor and an IR sensor. In another example, the circuit 908 may be implemented as an RGB-IR sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor(s) 908. The lens assembly 906 may implement an optical lens or lenses. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor(s) 908 may receive light from the lens assembly 906. The image sensor(s) 908 may be configured to transform the received focused light into digital data (e.g., bitstreams). In some embodiments, the image sensor(s) 908 may perform an analog to digital conversion. For example, the image sensor(s) 908 may perform a photoelectric conversion of the focused light received from the lens assembly 906. The image sensor(s) 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930a-930n may be processor circuits. In various embodiments, the circuits 930a-930n may include one or more embedded processors (e.g., ARM, etc.). The circuits 932a-932n may implement a number of computer vision related processor circuits. In an example, one or more of the circuits 932a-932n may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the resources of the processors 932a-932n may be configured to efficiently perform various specific operations in hardware and the processors 930a-930n may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 98 may be implemented in the local memory system 938. The circuit 940 may implement a sensor input (or interface). The circuit 942 may implement one or more control interfaces including but not limited to an inter device communication (IDC) interface, an inter integrated circuit (I2C) interface, a serial peripheral interface (SPI), and a pulse width modulation (PWM) interface. The circuit 944 may implement an audio interface (e.g., an I2S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module. The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I2S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, LTE_M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone®, and I/O visualization, and DRAM scrambling. In an example, the security module 958 may include a true random number generator. In an example, the security module 954 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE_M, NB-IoT, etc. The processor/camera circuit 902 may also include support for communication using one or more of the universal serial bus protocols (e.g., USB 1.0, 2.0, 3.0, etc.).

The functions performed by and structures illustrated in the diagrams of FIGS. 1 to 6 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data; and
   a processor configured to (i) process said pixel data arranged as a plurality of input image frames and (ii) store and execute a convolutional neural network that simultaneously generates a plurality of output data in response to said plurality of input image frames, wherein
   (a) said convolutional neural network comprises (i) an input to simultaneously receive said plurality of input image frames, (ii) an output configured to simultaneously present said plurality of output data, and (iii) a plurality of convolutional layers,
   (b) a first layer of said plurality of convolutional layers is configured to simultaneously process said plurality of input image frames, (c) a last layer of said plurality of convolutional layers is configured to simultaneously generate said plurality of output data, (d) each of said plurality of input image frames corresponds to a first subset of instances of time, (e) each of said plurality of output data represents a second subset of instances of time, and (f) a number of computations by said processor is reduced, compared to generating each of said plurality of output data for said second subset of instances of time sequentially, by generating each of said plurality of output data for said second subset of instances of time simultaneously from said plurality of input image frames from said first subset of instances of time when an increase in said computations for generating said output data for said second subset of instances of time simultaneously is less than a multiple of a number of said computations to generate said output data for one of said instances of time from said second subset.

2. The apparatus according to claim 1, wherein each of said plurality of output data comprises a predetermined number of planes.

3. The apparatus according to claim 1, wherein:
said plurality of input image frames comprises a first number of input image frames;
said plurality of output data comprises a second number of output data; and
said first number is equal to said second number.

4. The apparatus according to claim 1, wherein:
said plurality of input image frames comprises a first number of input image frames;
said plurality of output data comprises a second number of output data; and
said first number is greater than said second number.

5. The apparatus according to claim 1, wherein each of plurality of said input image frames comprises a Bayer pattern frame and each of said plurality of output data comprises at least one of RGB frames or YUV frames.

6. The apparatus according to claim 1, wherein said plurality of input image frames comprises a first time series of images and said plurality of output data comprises a second time series of detections.

7. The apparatus according to claim 6, wherein said detections comprise objects detected and locations.

8. The apparatus according to claim 7, wherein each of said plurality of output data comprises a separate plane for each object type.

9. The apparatus according to claim 1, wherein said plurality of input image frames comprises a first time series of images and said plurality of output data comprises a second time series of segmentation maps.

10. The apparatus according to claim 1, wherein said convolutional neural network is implemented using a UNet architecture comprising a number of expansion blocks equal to a number of contraction blocks.

11. A method of processing images using a convolutional neural network comprising:
receiving pixel data;
processing said pixel data arranged as a plurality of input image frames; and
simultaneously generating a plurality of output data in response to said plurality of input image frames, using said convolutional neural network, wherein
(a) said convolutional neural network comprises (i) an input to simultaneously receive said plurality of input image frames, (ii) an output configured to simultaneously present said plurality of output data, and (iii) a plurality of convolutional layers, (b) a first layer of said plurality of convolutional layers is configured to simultaneously process said plurality of input image frames, (c) a last convolution layer of said plurality of convolutional layers is configured to simultaneously generate said plurality of output data, (d) each of said plurality of input image frames corresponds to a first subset of instances of time, (e) each of said plurality of output data represents a second subset of instances of time, and (f) a number of computations by for said convolutional neural network is reduced, compared to generating each of said plurality of output data for said second subset of instances of time sequentially, by generating each of said plurality of output data for said second subset of instances of time simultaneously from said plurality of input image frames from said first subset of instances of time when an increase in said computations for generating said output data for said second subset of instances of time simultaneously is less than a multiple of a number of said computations to generate said output data for one of said instances of time from said second subset.

12. The method according to claim 11, wherein each of said plurality of output data comprises a predetermined number of planes.

13. The method according to claim 11, wherein:
said plurality of input image frames comprises a first number of input image frames;
said plurality of output data comprises a second number of output data; and
said first number is equal to said second number.

14. The method according to claim 11, wherein:
said plurality of input image frames comprises a first number of input image frames;
said plurality of output data comprises a second number of output data; and
said first number is greater than said second number.

15. The method according to claim 11, further comprising:
receiving said pixel data comprising a plurality of Bayer pattern frames;
converting each of the plurality of Bayer pattern frames to a first number of input planes having a reduced spatial resolution;
performing a first convolution on said first number of input planes using said first layer of said plurality of convolutional layers;
processing a result of said first layer of said plurality of convolutional layers using a fully convolutional network;
generating a second number of output planes having said reduced spatial resolution by performing a last convolution on an output of said fully convolutional network using said last layer of said plurality of convolutional layers; and
generating said plurality of output data from said second number of output planes having said reduced spatial resolution by performing a sub-pixel convolution to obtain at least one of a plurality of RGB frames or a plurality of YUV frames.

16. The method according to claim 15, wherein said fully convolutional network is implemented using a UNet architecture comprising a number of expansion blocks equal to a number of contraction blocks.

17. The method according to claim 11, wherein said plurality of input image frames comprises a first time series of images, said plurality of output data comprises a second time series of detections, and said detections comprise objects detected and locations.

18. The method according to claim 17, wherein each of said plurality of output data comprises a separate plane for each object type.

19. The apparatus according to claim 1, wherein said convolutional neural network is part of a video processing pipeline.

20. The apparatus according to claim 1, wherein said convolutional neural network is executed using a plurality of dedicated hardware engines configured by a scheduler to reduce computational complexity and power consumption.

* * * * *